(12) United States Patent
Koch et al.

(10) Patent No.: US 8,450,939 B2
(45) Date of Patent: May 28, 2013

(54) METHOD FOR IGNITING AND STARTING HIGH-PRESSURE DISCHARGE LAMPS

(75) Inventors: Bernd Koch, Berlin (DE); Stefan Lichtenberg, Falkensee (DE)

(73) Assignee: OSRAM AG, Munich (DE)

( * ) Notice: Subject to any disclaimer, the term of this patent is extended or adjusted under 35 U.S.C. 154(b) by 367 days.

(21) Appl. No.: 12/598,942

(22) PCT Filed: May 7, 2007

(86) PCT No.: PCT/EP2007/054393
§ 371 (c)(1),
(2), (4) Date: Nov. 5, 2009

(87) PCT Pub. No.: WO2008/135089
PCT Pub. Date: Nov. 13, 2008

(65) Prior Publication Data
US 2010/0141165 A1    Jun. 10, 2010

(51) Int. Cl.
*H05B 37/00* (2006.01)

(52) U.S. Cl.
USPC ............... 315/291; 315/307; 315/DIG. 2

(58) Field of Classification Search
USPC ........... 315/246, 268, 291, 307, 308, DIG. 2, 315/DIG. 5, 209 R, 224
See application file for complete search history.

(56) References Cited

U.S. PATENT DOCUMENTS

| | | | |
|---|---|---|---|
| 5,932,976 A | 8/1999 | Maheshwari et al. | |
| 6,518,712 B2 | 2/2003 | Weng | |
| 6,888,321 B2 * | 5/2005 | Arimoto et al. | 315/289 |
| 7,145,293 B2 | 12/2006 | Braun et al. | |
| 7,161,308 B2 * | 1/2007 | Kanno et al. | 315/291 |
| 7,541,748 B2 * | 6/2009 | Haruna et al. | 315/291 |
| 2003/0222594 A1 | 12/2003 | Mita | |

FOREIGN PATENT DOCUMENTS

| | | |
|---|---|---|
| CN | 1462168 A | 12/2003 |
| DE | 102004017479 A1 | 10/2005 |
| EP | 0987928 B1 | 12/2003 |
| EP | 1694101 A1 | 8/2006 |
| JP | 2003-243194 A | 8/2003 |
| JP | 2005-108800 A | 4/2005 |

OTHER PUBLICATIONS

International Search Report dated Sep. 7, 2007.
English abstract for JP 2003-243194. Aug. 29, 2003.
English abstract for JP 2005-108800. Apr. 21, 2005.

* cited by examiner

*Primary Examiner* — David Hung Vu

(57) ABSTRACT

A method for igniting and for starting high-pressure discharge lamps is provided. The method may include applying a takeover voltage to the lamp for a predetermined time of a burst; superimposing ignition pulses on the takeover voltage in such a way that the voltage of the ignition pulses and the takeover voltage are added up and an interruption being provided between two bursts; and changing the ignition pulses from burst to burst or within a burst from the positive half-cycle of the takeover voltage to the negative half-cycle of the takeover voltage, and vice versa.

5 Claims, 3 Drawing Sheets

METHOD FOR IGNITING AND STARTING HIGH-PRESSURE DISCHARGE LAMPS

RELATED APPLICATIONS

The present application is a national stage entry according to 35 U.S.C. §371 of PCT application No.: PCT/EP2007/054393 filed on May 7, 2007.

BACKGROUND

The invention relates to a method for igniting high-pressure discharge lamps. The invention relates primarily to an ignition method, which can be implemented in an electronic operating device and which addresses the problem of the willingness of discharge lamps to ignite in a polarity-dependent manner. Electronic ballasts have been used increasingly for a relatively long period of time. High-pressure discharge lamps are more difficult to handle in terms of their mode of operation than low-pressure discharge lamps, and the electronic operating devices are therefore more complex. Generally, high-pressure discharge lamps are operated with a low-frequency square-wave current, which is also referred to as "rocking DC operation". This square-wave current fluctuates in the range between 100 Hz and 1 kHz, and ensures that the electrodes of the lamp are subjected to a uniform load, despite virtually DC operation. Until now, a full-bridge has usually been used for generating this signal. Since this results in high costs, in recent times there has been a switch to using a half-bridge for signal generation, and to incorporate the lamp in a balancing network including four coupling capacitors.

DE 10 2004 017 479 A1 has disclosed such a ballast. In this case, the lamp is operated using a low-frequency square-wave signal. For ignition purposes, such operating devices often have a superimposed ignition device which modulates a high ignition voltage pulse of several thousand volts onto the voltage present across the lamp. This modulation has previously been provided only in the positive-polarity quadrant or only in the negative-polarity quadrant of the lamp voltage. Thus, until now only positive or only negative ignition pulses have always been applied to the lamp. In this case, the voltage of the ignition pulses always remained the same in comparison with the no-load voltage applied to the lamp (the so-called takeover voltage). However, there are no lamps which develop unconventional properties when they are always subject to ignition pulses of the same polarity. They then act as a kind of diode, which brings about difficulties in the case of driving with a half-bridge and balancing capacitors. The capacitors are charged non-uniformly, which then has an effect on the voltage across the lamp, which can then no longer be brought into operation. The operating device attempts to ignite the lamp for a certain time. If this is unsuccessful, the operating device disconnects the voltage for a relatively long period of time before a new attempt is started. This time is necessary for the lamp to return to a state which does not immediately trigger a rectification effect again. This is extremely annoying for the user since it is necessary to wait for a long period of time before the luminaire actually emits light.

Various embodiments improve the method for igniting high-pressure discharge lamps in order to be able to start the lamps more quickly.

SUMMARY

The ignition of high-pressure discharge lamps is normally provided in so-called bursts. These bursts are typically a few seconds long. In this time, ignition pulses with a frequency of a few tens of Hertz to a few thousands of Hertz are applied to the lamp. Until now, ignition pulses with always the same polarity have been produced in these bursts. After a large number of such ignition pulses, some lamps fall into a state in which they rectify the lamp current applied to them. As a result of this rectification effect, the coupling capacitors are not charged uniformly. This is observed by the operating device, and said operating device disconnects the ignition and lamp voltage, since this is an abort criterion. In order to make the charge in the coupling capacitors uniform again and to bring the lamp back into a state which does not again trigger a rectification effect in the case of new ignition pulses, a relatively long interruption is required. It is therefore proposed in various embodiments either to shorten the interruption after the abort criterion and to allow the next burst with ignition pulses which are phase-shifted through 90° relative to the takeover voltage to run, or to change the phase angle of the ignition pulses without an abort within a burst as soon as the abort criterion has been reached. This firstly has the advantage that the lamp state is normalized again, and secondly the coupling capacitors are brought back into a uniform state of charge more quickly as a result of the polarity reversal.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
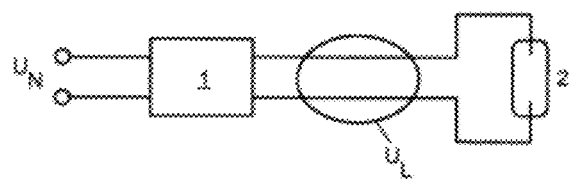
FIG. 1 shows an arrangement with an operating device and a lamp. The lamp voltage $U_L$ is measured between the operating device and the lamp.

FIG. 1 shows an electronic operating device (1) with a lamp (2) connected thereto. $U_L$ denotes the lamp voltage which is present across the lamp (2).

Figure 2:
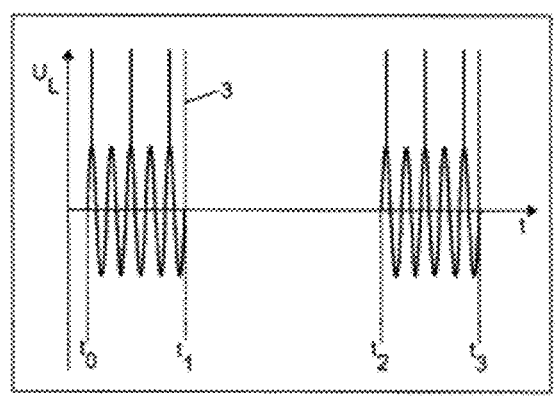
FIG. 2 shows an illustration of the sequence for the ignition in accordance with the prior art.

In FIG. 2, this lamp voltage for the method in accordance with the prior art is plotted over time. At time $t_0$, the operating device begins with the lamp ignition. In the process, a lamp voltage, which in this case is sinusoidal, is applied to the lamp. This voltage is normally a few hundred volts and is used for stabilizing the gas discharge after an electrical breakdown between the lamp electrodes. The voltage is therefore referred to as the takeover voltage because it is intended to ensure that the lamp takes over the power provided after the ignition. At any second positive maximum, a voltage of several kV is superimposed on an ignition pulse. In comparison with the takeover voltage, the ignition pulse has either the same polarity or the opposite polarity. The frequency of the sinusoidal oscillation typically fluctuates at a few kHz. A very great number of ignition pulses per second are therefore applied to the lamp. This can result, as already mentioned above, in the lamp having a rectifying property as a result of the interaction of the plasma and the electrode. As a result, the coupling capacitors are loaded non-uniformly, with the result that the charge stored therein likewise becomes less and less uniform. After some time, this results in a state which causes the operating device to abort the ignition at time $t_1$. Then, a relatively long interruption up to time $t_2$ is provided in the running of the operating device, and this interruption is required for making the charge in the coupling capacitors uniform again and cooling the lamp with the fill and the electrodes to such an extent that it again operates as normal.

First Embodiment

Figure 3:
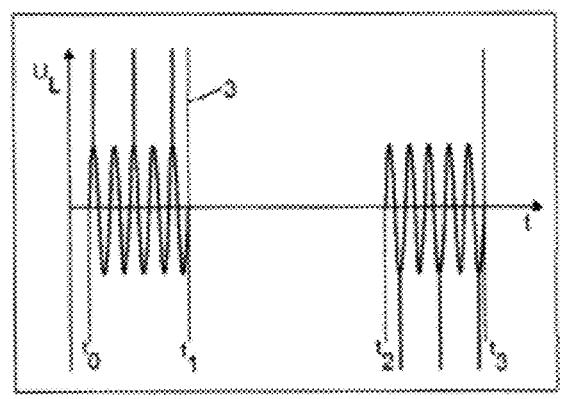
FIG. 3 shows an illustration of the sequence for the ignition in accordance with the present invention of the first embodiment with a sinusoidal lamp voltage.

The invention begins at this point. FIG. 3 shows the method according to the invention in accordance with the first embodiment.

In the first burst, the two methods do not differ from one another. Ignition pulses which have the same or opposite polarity in comparison with the takeover voltage are applied to the lamp. The time between $t_1$ and $t_2$, i.e. the time between the abort criterion 3 and a second burst, is shorter with the method according to the invention, however. In a second burst, ignition pulses with a phase angle which is opposite that in the first burst are then applied to the lamp. This results in the plasma of the lamp being unable to form in such a way that the lamp operates as a rectifier.

Astonishingly, it has been shown that a simple polarity reversal of the ignition pulses in the second burst solves the problems associated with the lamp ignition in the prior art. As a result of the polarity reversal, the coupling capacitors are subject to a uniform load, when considered over both bursts. In addition, the lamp is prevented from assuming the state in which it acts as a rectifier by virtue of ignition pulses of different polarity in comparison with the takeover voltage. As a result of this, the lamp can normally start without any problems during the second burst.

Figure 4:
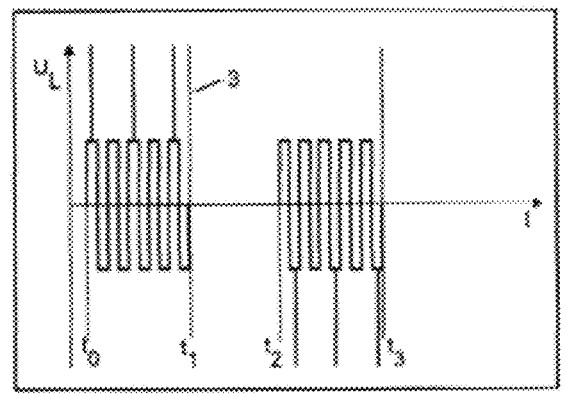
FIG. 4 shows an illustration of the sequence of the ignition in accordance with the present invention of the first embodiment with a square-wave lamp voltage.

This method can of course not only be applied in devices which apply a sinusoidal voltage with a relatively high frequency to the lamp, but also in operating devices which use a square-wave voltage, which can then also have a lower frequency. The voltage profile for such a device is illustrated in FIG. 4. The ignition voltage pulses are in this case arranged in the center of the square wave. However, they can also be superimposed right at the start of the square wave, or at the end or at any other desired point.

Second Embodiment

Figure 5:
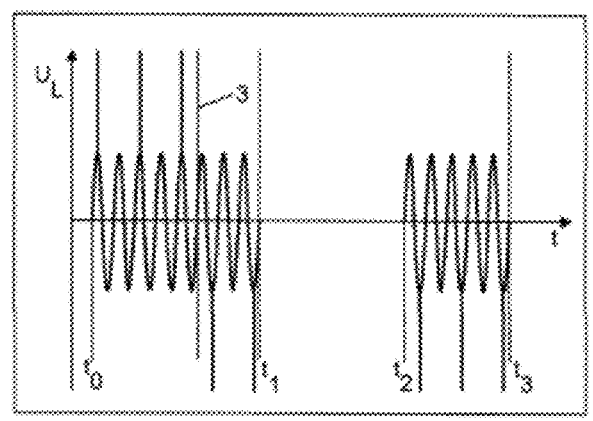
FIG. 5 shows an illustration of the sequence of the ignition in accordance with the present invention of the second embodiment with a sinusoidal lamp voltage.

In the case of lamps that are particularly difficult to start, it may arise that the lamp demonstrates rectifier operation as early as in the first burst, and therefore the abort criterion 3 is reached as early as in the first burst. The second embodiment is thus a development of the first embodiment, in which the abort criterion 3 no longer results in an abort. In this embodiment, the polarity of the ignition pulses within a burst is changed as soon as the abort criterion 3 is met (FIG. 5). The immediate reversal of the polarity counteracts the rectification effect immediately, and the lamp can be brought closer to the "normal state" again towards the end of the burst at time $t_2$. It is of course also possible for this embodiment to be applied to a square-wave voltage or to any other suitable AC voltage.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

Additionally, please cancel the originally-filed Abstract of the Disclosure, and add the accompanying new Abstract of the Disclosure which appears on a separate sheet in the Appendix.

The invention claimed is:

1. A method for igniting and for starting high-pressure discharge lamps, the method comprising: applying a takeover voltage to the lamp for a predetermined time of a burst; superimposing ignition pulses on said takeover voltage in such a way that the voltage of the ignition pulses and the takeover voltage are added up and an interruption being provided between two bursts; and changing the ignition pulses from burst to burst or within a burst from the positive half-cycle of the takeover voltage to the negative half-cycle of the takeover voltage, and vice versa.

2. The method for igniting and for starting high-pressure discharge lamps as claimed in claim 1, wherein the interruption between two bursts is shortened.

3. The method for igniting and for starting high-pressure discharge lamps as claimed in claim 1, wherein the ignition pulses are changed from the positive half-cycle of the takeover voltage to the negative half-cycle of the takeover voltage, and vice versa, as soon as the abort criterion in a burst is reached, and not aborting the burst.

4. The method for igniting and for starting high-pressure discharge lamps as claimed in claim 1, wherein the takeover voltage is a sinusoidal voltage with a frequency of several kHz.

5. The method for igniting and for starting high-pressure discharge lamps as claimed in claim 1, wherein the takeover voltage is a square-wave voltage in the 100 Hz range.

\* \* \* \* \*

UNITED STATES PATENT AND TRADEMARK OFFICE
CERTIFICATE OF CORRECTION

| | |
|---|---|
| PATENT NO. | : 8,450,939 B2 |
| APPLICATION NO. | : 12/598942 |
| DATED | : May 28, 2013 |
| INVENTOR(S) | : Koch et al. |

It is certified that error appears in the above-identified patent and that said Letters Patent is hereby corrected as shown below:

In the Specification

Col. 4, delete lines 23 to 26: "Additionally, ... Appendix."

Signed and Sealed this
Eleventh Day of November, 2014

Michelle K. Lee
*Deputy Director of the United States Patent and Trademark Office*